United States Patent [19]

Godziemba-Maliszewski

[11] Patent Number: 4,784,313
[45] Date of Patent: Nov. 15, 1988

[54] METHOD FOR BONDING SILICON CARBIDE MOLDED PARTS TOGETHER OR WITH CERAMIC OR METAL PARTS

[75] Inventor: Jerzy Godziemba-Maliszewski, Jülich, Fed. Rep. of Germany

[73] Assignee: Kernforschungsanlage Jülich Gesellschaft mit beschränkter Haftung, Jülich, Fed. Rep. of Germany

[21] Appl. No.: 14,992

[22] Filed: Feb. 17, 1987

[30] Foreign Application Priority Data

Mar. 14, 1986 [DE] Fed. Rep. of Germany ....... 3608559

[51] Int. Cl.$^4$ .................... B23K 1/04; B23K 20/02
[52] U.S. Cl. .................... 228/194; 228/124; 228/263.12
[58] Field of Search ........... 228/122, 124, 194, 263.12

[56] References Cited

U.S. PATENT DOCUMENTS

| 3,152,871 | 10/1964 | Matchen | 228/263.12 |
| 4,335,998 | 6/1982 | Siebels | 228/122 |
| 4,426,033 | 1/1984 | Mizuhara | 228/122 X |
| 4,487,644 | 12/1984 | Gupta et al. | 156/89 |
| 4,526,649 | 7/1985 | Gupta et al. | 156/629 |
| 4,684,052 | 8/1987 | McDonald | 228/122 |

FOREIGN PATENT DOCUMENTS

| 2311022 | 6/1972 | Fed. Rep. of Germany . |
| 2318727 | 11/1973 | Fed. Rep. of Germany . |
| 2434122 | 2/1975 | Fed. Rep. of Germany . |
| 2922953 | 12/1979 | Fed. Rep. of Germany . |
| 3003186 | 8/1981 | Fed. Rep. of Germany . |
| 3307791 | 10/1983 | Fed. Rep. of Germany . |
| 3311553 | 10/1984 | Fed. Rep. of Germany . |
| 95670 | 6/1983 | Japan | 228/263.12 |
| 33268 | 2/1985 | Japan | 228/263.12 |

OTHER PUBLICATIONS

Maliszewski et al, "Fortschrittsbericht der Dt. Keram. Gesellschaft", vol. 1 (1985), pp. 188–198.
Derwent Accession, Questel Telesystem (WPI), pp. 74–86, 454v.
Derwent Accession No. 82-12825e (Japan 3,781, Abstract 1/9/82).

*Primary Examiner*—Kenneth J. Ramsey
*Attorney, Agent, or Firm*—Frishauf, Holtz, Goodman & Woodward

[57] ABSTRACT

Molded bodies of SiC ceramic can be firmly bonded to each other or to molded bodies of other ceramic material or to metal workpieces by the establishment of diffusion-welding conditions when a metal alloy layer is interposed between cleaned and polished surfaces that are to be joined. The alloy metal of the layer is MnCu or MnCo or multi-component alloys containing the foregoing as a base and additions of other metals to a total percentage not exceeding 70% with each single other metal being present in the range from 2 to 45% by weight. Such other metals constitute 1 or more of Cr, Ti, Zr, Fe, Ni, V and Ta. The Mn, Cu alloy or alloy base has a Cu content from 10 to 90%, preferably 25 to 82% and the MnCo alloy or alloy base has a cobalt content of 5 to 50% by weight. MnCuFe eutectic compositions containing 5 to 30% by weight Fe and 10 to 90% by weight Cu and MnCoCr eutectic compositions with chromium content from 2 to 45% by weight are preferred, especially 50:40:10 MnCuFe and 60:30:10 MnCoCr. Preferred alloy metal layer thickness is from 5 to 200 μm, especially about 10 to 50 μm. In the case of SiSiC bodies, a preliminary treatment to convert free silicon at or near the surface to be joined into silicon nitride or silicon carbide is desirable.

26 Claims, No Drawings

METHOD FOR BONDING SILICON CARBIDE MOLDED PARTS TOGETHER OR WITH CERAMIC OR METAL PARTS

This invention concerns a method and an alloy type material for bonding parts molded of silicon carbide ceramic with each other or with molded parts of other ceramic material or of metal, in which the surfaces to be bonded are joined with interposition of a metal layer under conditions favoring diffusion welding of the joint. The invention also includes provisions in the method of the invention for handling of molded parts of SiSiC in such bonding for preliminary disposition of free silicon coming from the surface layer.

In view of its strength and its good resistance to corrosion, silicon carbide is a most interesting material for high-temperature applications. Its high hardness, however, brings about substantial difficulties in shaping and other working of the material. In consequence, it is known to produce complicated workpieces by bonding together simpler individual parts. Likewise, the bonding of silicon carbide with shaped bodies of metal or of other ceramics is sometimes necessary.

High-temperature joining methods are known for heat-resistant bonding of molded parts of silicon carbide with each other or with molded parts of another ceramic such as, for example, aluminum oxide or zirconium oxide, as follows:

German published patent application DE-OS Nos. 30 03 186, for example, describes diffusion welding of individual parts of SiSiC at temperatures below 1300° C. while the bonding surfaces are at the same time subjected to pressure. According to another German published patent application DE-OS No. 31 39 270, well prepared SiSiC fitting surfaces are bonded to each other by heating at from 1500° C. to 1800° C.

According to another joining method, carbon is brought into or between the bonding surfaces and converted into silicon carbide at high temperature with introduction of silicon (see DE-OS documents Nos. 29 22 953 and 33 11 553).

Bonding of molded parts of silicon-free silicon carbide with metal parts or with more silicon carbide by means of a metallic transition layer is described in Report BMFT-FB T 79-124, in which thin layers of a thickness between 100 and 500 μm of hot-pressed tungsten and molybdenum powder are used.

The above-described known joining methods are expensive and often too complicated for putting into technological practice. These methods, furthermore, limit the extent of introduction of silicon carbide in terms of utilization temperature and strength. Such bonds, moreover, also have insufficient lasting qualities for applications involving exposure to high temperature in air.

Finally, in the publication "Fortschrittsbericht der Dt. Keram. Gesellschaft", Vol. 1, (1985), pp. 188–198, experiments were reported regarding bonding of silicon carbide with metals by diffusion welding by means of a metallic intermediate layer of silicide and/or carbide forming metals, such as Pt,Pd,Cu,Ni,Co,Fe,Mn,Cr,Mo,Zr,Nb,Hf,Al,Ti,V,Ta and W.

In these experiments, especially for those in which nickel, copper and platinum were selected as the metals in question, no satisfactory bonds could be obtained, however. Instead, pores appeared in the boundary layers and crack formation appeared growing out from the transition between metal and silicon carbide. In consequence, introduction of the method into practice was not possible.

SUMMARY OF THE INVENTION

It is an object of the invention to provide a joining method for the kinds of parts above described in which a bond free of pores and cracks is obtained, which is usable in practice for a relatively wide range of application possibilities and can be carried out with only limited process and apparatus expense.

Briefly, the surfaces to be bonded together are joined with interposition of a metal layer composed of a manganese-containing alloy, either MnCu with 10 to 90% and preferably 25 to 82% by weight of Cu, or else MnCo with 5 to 50% by weight of Co, preferably additionally containing, in either case, from 2 to 45% by weight of at least one of the metals Cr,Ti,Zr,Fe,Ni,V and/or Ta provided that the sum of such additions does not exceed 70% by weight.

The composition of these alloys can be selected in a manner suitable to the expected requirements in use by selecting as additive alloy elements the metals Cr,Ti and Zr as carbide and silicide producers, Ni and Fe as predominantly silicide producers or Ta and V as predominantly a carbide producer.

There is especially preferred for the interposed metal alloy layer a eutectic composition of MnCuFe alloy, the eutectic composition being found within the range of 5 to 30% by weight of Fe and 10 to 90% by weight of Cu, with the rest Mn, or else a eutectic composition alloy MnCoCr alloy within the range of 2 to 45% Cr.

Particularly useful, especially for bonding of SiC molded parts to each other, are layers of MnCuFe having a composition in the weight percentage range from 50:40:10 to 40:50:10 or a MnCoCr alloy of 60:30:10 in percentage by weight.

Manganese-copper alloys with from 25 to 82% by weight of copper have melting points between 870° and 1115° C.

Examples of useful compositions in percentage by weight for manganese-copper-iron alloys are given in the following table along with their respective melting points.

| No. | Wt. % Mn | Wt. % Cu | Wt. % Fe | M.P. °C. |
|---|---|---|---|---|
| 1 | 50 | 20 | 30 | 1230 |
| 2 | 60 | 30 | 10 | 1150 |
| 3 | 50 | 30 | 20 | 1180 |
| 4 | 50 | 40 | 10 | 1150 |
| 5 | 40 | 50 | 10 | 1170 |
| 6 | 30 | 65 | 5 | 1130 |
| 7 | 10 | 85 | 5 | 1180 |
| 8 | 5 | 90 | 5 | 1180 |

Alloys of manganese and cobalt with 5 to 50% cobalt by weight have melting points between 1180° and 1220° C.

Manganese alloy layers in a thickness from 3 μm up to 1000 μm, better up to 500 μm, especially up to 200 μm and preferably from 5 to 50 μm are utilized in the joining process of the invention. Most preferred is a thickness of about 10 μm. These layers can be interposed between the surfaces to be joined as alloy foils, as powder layers or in any other known way. The surfaces to be joined are cleaned before the alloy layer is interposed and, after interposition of the alloy layer and putting together of the parts to be joined, the assembly is subjected to a diffusion welding process. Alternatively, in view of the very thin alloy layer most preferred, the clean joint surface of the silicon carbide molded parts to be joined is furnished with its own alloy layer by vapor deposition, sputtering or some other deposition method.

Diffusion welding of the assembly is then performed by heating under application of pressure between 0.5 and 60 MPa up to a temperature from about 20° C. to 300° C. below the melting point of the interposed layer, thus to a temperature between 850° and 1300° C., for a period of 5 to 50 minutes, preferably between 10 and 15 minutes, in order to unite in this way the surfaces to be bonded together.

In this method of joining, however, at least the bonding surface of any silicon carbide molded part should show no free silicon content (at the very most no more than 0.1%). For that reason, molded parts of SiSiC must preliminarily be treated with carbon in the form of carbon black or with a gaseous compound forming silicon carbide, or else treated with nitrogen at a raised temperature, in order to convert the free silicon into silicon carbide or silicon nitride.

The present process is well suited for bonding silicon carbide molded parts to each other and to molded parts of other ceramic materials as, for example, $Al_2O_3$ or $ZrO_2$ and also for bonding silicon carbide molded parts with molded or otherwise shaped parts of structural or constructional metals such as steel, stainless steel, copper, bronze, beryllium bronze, nickel base alloys and alloys respectively known in the trade as "zircaloy" and "Vacon", bare surfaces of which are capable of remaining metallic, clean and untarnished from a time of cleaning until the beginning of a diffusion welding procedure. In bonding silicon carbide parts to metal, it is important for the composition of the interposed alloy layer to be compatible with the metallic part to be bonded to the silicon carbide part. Thus, alloy components of the metallic part which would tend to penetrate into the bonding layer (with depletion of the portions of the metallic part near the joint boundary), should have such diffusion tendencies inhibited by the composition of the interposed alloy layer, for example by the choice and relative content of the above-mentioned additives in the alloy.

The selection of the MnCuFe or MnCoCr composition that is to be preferred for the case should also be guided according to the nature of the metallic or ceramic part to be joined to the silicon carbide part. The usual diffusion welding temperature of that metal or of the other ceramic should lie distinctly below the melting point of the MnCu(Fe) or MnCo(Cr) layer, preferably 100° to 150° below that melting point.

The invention is now further described with reference to particular illustrative examples.

EXAMPLE 1

This example illustrates the bonding together of silicon carbide and copper. The bonding surface of the silicon carbide part is given a preliminary treatment by grinding with a diamond grinding disk (grain size: 30 μm) followed by degreasing with alcohol. The copper surface to be bonded is sandpapered with No. 320 abrasive paper, then picked with 1:1 water-diluted 65% nitric acid and finally degreased with alcohol.

Between the silicon carbide and copper surfaces thus ground and cleaned, there is inserted a metal foil pickled and degreased in the same way as the copper surface and composed of a MnCuFe alloy of 40:50:10 composition by weight having a melting point of 1170° C., of a thickness of 200 μm. The foil is pressed between the surfaces to be joined with a pressure of 10 MPa and the assembly thus under compression is heated in vacuum (minimum 0.133 Pa) for fifteen minutes at 900° C. A firm diffusion bond between silicon carbide and copper is obtained in this manner.

EXAMPLE 1A

As an alternative to Example 1, the same MnCuFe with the thickness of 50 μm is vapor deposited on the ground and cleaned silicon carbide surface to be bonded and the surface so treated is then joined to the cleaned copper surface to be bonded by diffusion welding under the same pressure and temperature conditions as in Example 1.

The firm diffusion bond is obtained in this manner just as in Example 1.

EXAMPLE 2

A surface containing free silicon from reaction-bound silicon carbide (SiSiC) was preliminarily treated for bonding with metals or with more silicon carbide as follows:

The ground and cleaned surface to be bonded which contained free silicon was coated with carbon black and heated in vacuum (0.133 Pa) for 50 minutes at 1100° C.

After cooling the surface thus treated was freed of excess carbon black and was then ready for participation in a joining process for bonding with either metallic materials or other silicon carbide parts in accordance with other examples set forth herein.

EXAMPLE 3

The silicon carbide surface preliminarily treated as in Example 2 was joined, in one case with a metallic workpiece and in another case with another silicon carbide part by first interposing a foil MnCuFe of 30:65:5 composition by weight and melting point 1130° C. and then subjecting to a diffusion welding process at 1050° C. for 10 minutes at 20 MPa.

EXAMPLE 4

A surface of a silicon carbide part which was to be bound was preliminarily treated as in Example 1 and a surface to be bonded thereto of a stainless steel workpiece was sanded with abrasive paper No. 320, pickled with a mixture of 50 ml of 65% nitric acid, 20 ml of 40% hydrofluoric acid and 70 ml of water, and then degreased with alcohol. A foil 200 μm thick and preliminarily treated as in Example 1, composed of MnCuFe of 40:50:10 composition by weight and melting point of 1170° C. was interposed and the surfaces to be joined pressed together at 10 MPa. The assembly was then heated in vacuum (it could also have been heated in argon gas) for 20 minutes at 1100° C. for diffusion welding. A firm diffusion bond between the silicon carbide and the stainless steel was obtained in this manner.

EXAMPLE 4A

As in Example 1, instead of using a foil interposed in the joint, Example 4 was repeated by vapor depositing the MnCuFe alloy on the silicon carbide surface, then putting together the coated silicon carbide surface with the stainless steel workpiece and subjecting the surfaces thus put together under pressure as in Example 4 to heat in a diffusion welding operation. A firm diffusion bond between the silicon carbide and the stainless steel was again obtained.

EXAMPLE 5

A clean foil 300 μm thick of MnCuFe (50:30:20 composition by weight, melting point 1180° C.) was introduced between polished and cleaned surfaces of two silicon carbide parts. The surfaces were pressed together under a 20 MPa load and thus heated for 20 minutes in vacuum at 1100° C. for producing a diffusion weld joint. In this manner, a firm diffusion bond was obtained between these silicon carbide parts.

EXAMPLE 5A

The same results as obtained in Example 5 can also be obtained if instead of inserting a foil between the silicon carbide surfaces to be joined, the MnCuFe alloy is applied to one of the two silicon carbide surfaces to be joined by vapor deposition.

EXAMPLE 6

A foil of MnCu alloy of 38:62 composition by weight and a melting point of 870° C., of a thickness of 200 μm was inserted between the cleaned surfaces to be joined respectively of an aluminum oxide part and a silicon carbide part. The surfaces to be joined were pressed together at a pressure of 10 MPa and in that condition were subjected to a diffusion welding operation in vacuum at 860° C. for 15 minutes. In this manner, a firm diffusion bond between the two ceramic parts was obtained.

EXAMPLE 7

A bonding of silicon carbide with stainless steel was performed by grinding and polishing the silicon carbide joint surface with a diamond wheel of 30 μm grain size, followed by degreasing with alcohol and grinding and polishing the steel surface to be joined with No. 320 abrasive paper, then pickling it with a mixture of 50 ml of 65% nitric acid, 20 ml of 40% hydrofluoric acid and 70 ml of water, after which it was degreased with alcohol.

MnCoCr powder of 60:30:10 composition by weight was degreased with alcohol and then applied in a thickness of 500 μm between the cleaned surfaces of silicon carbide and steel which were to be joined. The joint was then diffusion welded by heating in vacuum ($10^{-2}$ Pa) at 1150° C. for 25 minutes with pressure of 60 MPa being applied to the joint. In this manner, a firm diffusion bond between silicon carbide and steel was obtained.

EXAMPLE 8

In order to obtain silicon carbide bonded to copper, the silicon carbide surface to be joined was first ground and polished with a diamond wheel of 30 μm grain size and then degreased with alcohol. The surface thus preliminarily treated was exposed in vacuum (10 Pa) to vapor of MnCuFe of 40:50:10 composition by weight from which the alloy was deposited onto the surface to a thickness of 100 μm (evaporation temperature 1200° C).

The surface on which MnCuFe was vapor-deposited was then put together with a copper bonding surface preliminarily treated by polishing, pickling and degreasing, and this assembly was heated for 15 minutes under 10 Mpa pressure applied to the assembly, in argon (10 kPa) at 900° C. for obtaining a diffusion welded joint. In this manner, a firm diffusion bond was obtained between the silicon carbide and copper.

EXAMPLE 9

A layer of MnCoCrTaV alloy of 68:32:10:6:4 composition by weight and a melting point of 1530° C., of a thickness of 50 μm was vapor-deposited on the cleaned surface of a silicon carbide part to be joined with an aluminum oxide part likewise cleaned. The surfaces to be joined were pressed together at a pressure of 20 MPa and in that condition were subjected to a diffusion welding operation in vacuum at 1045° C. for 15 minutes. In this manner, a firm diffusion bond between the two ceramic parts was obtained.

Although the invention has been described with reference to particular illustrative examples, it will be understood that still other variations are possible within the inventive concept.

I claim:

1. Method of joining molded SiC ceramic parts together or with ceramic parts formed of other ceramic materials, or with metal pieces, comprising the steps of:
   preparing abrasively polished, clean surfaces to be joined respectively of a molded silicon carbide part and of a workpiece which is of a material selected from the group consisting of silicon carbide, ceramics other than silicon carbide and structural metals capable of keeping a clean, untarnished metallic surface until the heating step set forth hereinbelow begins;
   interposing an alloy metal layer, of a thickness exceeding 3 μm and not exceeding 1000 μm, between said prepared surfaces to be joined and putting and holding said surfaces together while separated only by said alloy metal layer to produce a held-together assembly, said holding-together of said assembly being performed by mechanical pressure in the range from 0.5 to 60 MPa urging said prepared surfaces towards each other and said alloy metal being selected from the group consisting of (a) manganese-copper alloys in the by-weight composition range of 10 to 90% copper and (b) manganese-cobalt alloys in the by-weight composition range of 5 to 50% cobalt content, substantially all the remainder in each case being manganese; and
   heating said held-together assembly in the absence of oxidizing gas for an interval not less than 5 or more than 50 minutes at a temperature lying from 20° to 300° C. below the melting point of said alloy metal, which temperature is high enough to produce diffusion-welding at said held-together surfaces, and thereby firmly joining said surfaces together, followed by cooling.

2. Method according to claim 1, wherein said alloy metal is selected from the group consisting of (a) manganese-copper alloys in the by-weight composition range of 25 to 82% copper and (b) manganese-cobalt alloys in the by-weight composition range of 5 to 50% cobalt.

3. Method according to claim 1, wherein the interval for which said held-together assembly is heated at said temperature between 20° and 300° C. below the melting point of said alloy metal is not less than 10 nor more than 15 minutes long.

4. Method according to claim 1, wherein said alloy metal layer has a thickness in the range from 5 to 200 μm.

5. Method according to claim 4, wherein said alloy metal layer is interposed between said surfaces in the form of a metal foil.

6. Method according to claim 4, wherein said alloy metal layer is vapor-deposited on said prepared surface of said silicon carbide part.

7. Method according to claim 4, wherein said alloy metal layer is interposed by applying it to said prepared surface of said silicon carbide part by sputtering.

8. Method of joining molded SiC ceramic parts with each other or with ceramic parts formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean untarnished metallic surface until the heating step set forth hereinbelow begins;

interposing an alloy metal layer, of a thickness exceeding 3 $\mu$m and not exceeding 1000 $\mu$m, between said prepared surfaces to be joined and putting and holding said surfaces together while separated only by said alloy metal layer to produce a held-together assembly, said holding-together of said assembly being performed by mechanical pressure in the range from 0.5 to 60 MPa urging said prepared surfaces towards each other and said alloy metal having a base component combination selected from the group consisting of (a) manganese-copper alloys in the by-weight composition range of 10 to 90% copper content and (b) manganese-cobalt alloys in the by-weight composition range of 5 to 50% cobalt content, substantially all the remainder being in each case manganese including at least one alloy additive metal selected from the group consisting of chromium, titanium, zirconium, iron, nickel, vanadium and tantalum to an extent in which the total content of said additive metals in the said alloy metal does not exceed 70% by weight, the remainder being said alloy base and the content of any one of said alloy additive metals lies between 2 and 45% by weight of the alloy metal; and heating said held-together assembly in the absence of oxidizing gas for an interval not less than 5 or more than 50 minutes at a temperature lying from 20° to 300° C. below the melting point of said alloy metal, said temperature being high enough to produce diffusion-welding at said held-together surfaces, and thereby firmly joining said surfaces together, followed by cooling.

9. Method according to claim 8 wherein said base component of said alloy metal is selected from the group consisting of (a) manganese-copper alloys in the by-weight composition range of 25 to 82% copper content and (b) manganese-cobalt alloys in the by-weight composition range of 5 to 50% cobalt content.

10. Method according to claim 8, wherein the composition of said alloy metal layer is a MnCuFe eutectic composition within the composition range in which the iron content lies between 5 and 30% by weight and the copper content lies between 10 and 90% by weight.

11. Method according to claim 10, wherein the interval for which said held-together assembly is heated at said temperature between 20° and 300° C. below the melting point of said alloy metal is not less than 10 nor more than 15 minutes long.

12. Method according to claim 10, wherein said alloy metal layer has a thickness in the range from 5 to 200 $\mu$m.

13. Method according to claim 12, wherein said alloy metal layer is interposed between said surfaces in the form of a metal foil.

14. Method according to claim 12, wherein said alloy metal layer is vapor-deposited on said prepared surface of said silicon carbide part.

15. Method according to claim 12, wherein said alloy metal layer is interposed by applying it to said prepared surface of said silicon carbide part by sputtering.

16. Method according to claim 10, wherein said surfaces to be joined are both surfaces of silicon carbide bodies and wherein said MnCuFe eutectic composition of said alloy metal lies within a percentage by weight composition range extending from 50:40:10 to 40:50:10.

17. Method according to claim 8, wherein the composition of said alloy metal is a MnCoCr eutectic composition in which the chromium content lies between 2 and 45% by weight.

18. Method according to claim 17, wherein both said surfaces to be joined are surfaces of respective silicon carbide bodies and wherein said MnCoCr eutectic composition of said alloy metal is substantially 60:30:10.

19. A method of joining molded SiC ceramic parts together or with ceramic parts containing free Si in their surfaces formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean, untarnished metallic surface until the heating step set forth hereinbelow begins;

coating the prepared clean surface of said molded silicon carbide part with carbon black and thereafter heating it in the absence of reacting gas at a temperature between 900° and 1450° C. for a period from 10 to 150 minutes thereby converting free silicon of said prepared surface to silicon carbide;

interposing an alloy metal layer, of a thickness exceeding 3 $\mu$m and not exceeding 1000 $\mu$m, between said prepared surfaces to be joined and putting and holding said surfaces together while separated only by said alloy metal layer to produce a held-together assembly, said alloy metal being selected from the group consisting of (a) manganese-copper alloys in the by-weight composition range of 10 to 90% copper and (b) manganese-cobalt alloys in the by-weight composition range of 5 to 50% cobalt content, substantially all the remainder in each case being manganese; and heating said held-together assembly in the absence of oxidizing gas to a temperature distinctly below the melting point of said alloy metal and high enough to produce diffusion-welding at said held-together surfaces and thereby firmly joining said surfaces together, followed by cooling.

20. A method of joining molded SiC ceramic parts containing free Si in their surfaces together or with ceramic parts formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean, untarnished metallic surface until the heating step set forth hereinbelow begins;

heating said abrasively polished, clean surface of said molded silicon carbide part and said body on which it is prepared in nitrogen for a period of from 10 to 150 minutes at a temperature in the range from 900° to 1450° C. thereby converting free silicon of said prepared surface to silicon nitride;

interposing an alloy metal layer, of a thickness exceeding 3 µm and not exceeding 1000 µm, between said prepared surfaces to be joined and putting and holding said surfaces together while separated only by said alloy metal layer to produce a held-together assembly, said alloy metal being selected from the group consisting of (a) manganese-copper alloys in the by-weight composition range of 10 to 90% copper and (b) manganese-cobalt alloys in the by-weight composition range of 5 to 50% cobalt content, substantially all the remainder in each case being manganese; and heating said held-together assembly in the absence of oxidizing gas to a temperature distinctly below the melting point of said alloy metal and high enough to produce diffusion-welding at said held-together surfaces and thereby firmly joining said surfaces together, followed by cooling.

21. A method of joining molded SiC ceramic parts containing free Si in their surfaces together or with ceramic parts formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean, untarnished metallic surface until the heating step set forth hereinbelow begins;

heating said abrasively polished, clean surface of said molded silicon carbide part and said body having said clean surface in the presence of a carbon containing gas for a period having a duration between 10 and 150 minutes at a temperature in the range from 900° to 1450° C. for converting free silicon to silicon carbide;

interposing an alloy metal layer, of a thickness exceeding 3 µm and not exceeding 1000 µm, between said prepared surfaces to be joined and putting and holding said surfaces together while separated only by said alloy metal layer to produce a held-together assembly, said alloy metal being selected from the group consisting of (a) manganese-copper alloys in the by-weight composition range of 10 to 90% copper and (b) manganese-cobalt alloys in the by-weight composition range of 5 to 50% cobalt content, substantially all the remainder in each case being manganese; and heating said held-together assembly in the absence of oxidizing gas to a temperature distinctly below the melting point of said alloy metal and high enough to produce diffusion-welding at said held-together surfaces and thereby firmly joining said surfaces together, followed by cooling.

22. Method according to claim 21, in which said carbon containing gas is carbon monoxide.

23. A method of joining molded SiC ceramic parts containing free Si in their surfaces with each other or with ceramic parts formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean untarnished metallic surface until the heating step set forth hereinbelow begins;

coating the prepared clean surface of said molded silicon carbide part with carbon black and thereafter heating it in the absence of reactive gas at a temperature between 900° and 1450° C. for a period from 10 to 150 minutes thereby converting free silicon of said prepared surface to silicon carbide;

interposing an alloy metal layer, of a thickness exceeding 3 µm and not exceeding 1000 µm, between said prepared surfaces to be joined and putting and holding said surfaces together while separated only by said alloy metal layer to produce a held-together assembly, said alloy metal having a base component combination selected from the group consisting of (a) manganese-copper alloys in the by-weight composition range of 10 to 90% copper content and (b) manganese-cobalt alloys in the by-weight composition range of 5 to 50% cobalt content, substantially all the remainder being in each case manganese including at least one alloy additive metal selected from the group consisting of chromium, titanium, zirconium, iron, nickel, vanadium and tantalum to an extent in which the total content of said additive metals in the said alloy metal does not exceed 70% by weight, the remainder being said alloy base and the content of any one of said alloy additive metals lies between 2 and 45% by weight of the alloy metal; and heating said held-together assembly in the absence of oxidizing gas to a temperature distinctly below the melting point of said alloy metal and high enough to produce diffusion-welding at said held-together surfaces and thereby firmly joining said together, followed by cooling.

24. A method of joining molded SiC ceramic parts containing free Si in their surfaces with each other or with ceramic parts formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean untarnished metallic surface until the heating step set forth hereinbelow begins;

heating said abrasively polished, clean surface of said molded silicon carbide part and said body on which it is prepared in nitrogen for a period of from 10 to 150 minutes at a temperature in the range from 900° to 1450° C. thereby converting free silicon of said prepared surface to silicon nitride;

interposing an alloy metal layer, of a thickness exceeding 3 μm and not exceeding 1000 μm, between said prepared surfaces to be joined and putting and holding said surfaces together while separated only by said alloy metal layer to produce a held-together assembly, said alloy metal having a base component combination selected from the group consisting of (a) manganese-copper alloys in the by-weight composition range of 10 to 90% copper content and (b) manganese-cobalt alloys in the by-weight composition range of 5 to 50% cobalt content, substantially all the remainder being in each case manganese including at least one alloy additive metal selected from the group consisting of chromium, titanium, zirconium, iron, nickel, vanadium and tantalum to an extent in which the total content of said additive metals in the said alloy metal does not exceed 70% by weight, the remainder being said alloy base and the content of any one of said alloy additive metals lies between 2 and 45% by weight of the alloy metal; and heating said held-together assembly in the absence of oxidizing gas to a temperature distinctly below the melting point of said alloy metal and high enough to produce diffusion-welding at said held-together surfaces and thereby firmly joining said together, followed by cooling.

25. A method of joining molded SiC ceramic parts containing free Si in their surfaces with each other or with ceramic parts formed of other ceramic materials, or with metal pieces, comprising the steps of:

preparing abrasively polished, clean surfaces to be joined respectively of a molded silicon carbide part and of a workpiece which is of a material selected from the group consisting of silicon carbide, ceramics other than silicon carbide and structural metals capable of keeping a clean untarnished metallic surface until the heating step set forth hereinbelow begins;

heating said abrasively polished, clean surface of said molded silicon carbide part and said body having said clean surface in the presence of a carbon containing gas for a period having a duration between 10 and 150 minutes at a temperature in the range from 900° to 1450° C. for converting free silicon to silicon carbide;

interposing an alloy metal layer, of a thickness exceeding 3 μm and not exceeding 1000 μm, between said prepared surfaces to be joined and putting and holding said surfaces together while separated only by said alloy metal layer to produce a held-together assembly, said alloy metal having a base component combination selected from the group consisting of (a) manganese-copper alloys in the by-weight composition range of 10 to 90% copper content and (b) manganese-cobalt alloys in the by-weight composition range of 5 to 50% cobalt content, substantially all the remainder being in each case manganese including at least one alloy additive metal selected from the group consisting of chromium, titanium, zirconium, iron, nickel, vanadium and tantalum to an extent in which the total content of said additive metals in the said alloy metal does not exceed 70% by weight, the remainder being said alloy base and the content of any one of said alloy additive metals lies between 2 and 45% by weight of the alloy metal; and heating said held-together assembly in the absence of oxidizing gas to a temperature distinctly below the melting point of said alloy metal and high enough to produce diffusion-welding at said held-together surfaces and thereby firmly joining said together, followed by cooling.

26. Method according to claim 25, in which said carbon containing gas is carbon monoxide.

* * * * *